(No Model.)   5 Sheets—Sheet 1.

R. A. L. BLONDEL.
SANITARY SERVICE TANK FOR WATER CLOSETS.

No. 428,372.   Patented May 20, 1890.

WITNESSES:
Fred G. Dieterich
P. B. Turpin.

INVENTOR
Richard A. L. Blondel
BY
ATTORNEY (No Model.) 5 Sheets—Sheet 2.
R. A. L. BLONDEL.
SANITARY SERVICE TANK FOR WATER CLOSETS.

No. 428,372. Patented May 20, 1890.

WITNESSES:
Fred G. Dieterich
P. B. Turpin.

INVENTOR
Richard A. L. Blondel
BY Munn & Co.
ATTORNEY (No Model.) 5 Sheets—Sheet 3.
R. A. L. BLONDEL.
SANITARY SERVICE TANK FOR WATER CLOSETS.
No. 428,372. Patented May 20, 1890.

WITNESSES:
Fred G. Dieterich
P. B. Turpin

INVENTOR
Richard A. L. Blondel
BY Ulum T. C.
ATTORNEY (No Model.) 5 Sheets—Sheet 4.

R. A. L. BLONDEL.
SANITARY SERVICE TANK FOR WATER CLOSETS.

No. 428,372. Patented May 20, 1890.

WITNESSES:
Fred G. Dieterich
P. B. Turpin

INVENTOR
Richard A. L. Blondel
BY
Munn & Co.
ATTORNEY

THE NORRIS PETERS CO., PHOTO-LITHO., WASHINGTON, D. C.

(No Model.)  5 Sheets—Sheet 5.

R. A. L. BLONDEL.
SANITARY SERVICE TANK FOR WATER CLOSETS.

No. 428,372. Patented May 20, 1890.

WITNESSES:
Fred G. Dieterich
P. B. Turpin

INVENTOR
Richard A. L. Blondel.
BY
ATTORNEY

UNITED STATES PATENT OFFICE.

RICHARD A. L. BLONDEL, OF BALTIMORE, MARYLAND.

SANITARY SERVICE-TANK FOR WATER-CLOSETS.

SPECIFICATION forming part of Letters Patent No. 428,372, dated May 20, 1890.

Application filed May 23, 1889. Serial No. 311,913. (No model.)

*To all whom it may concern:*

Be it known that I, RICHARD A. L. BLONDEL, of Baltimore city, in the State of Maryland, have invented a new and useful Improvement in Sanitary Service-Tanks for Water-Closets, of which the following is a specification.

My invention is an improvement in sanitary service-tanks for water-closets, and has for its objects to provide certain improvements in the valve-manipulating devices.

The invention consists in certain novel constructions and combinations of parts, as will be hereinafter described, and pointed out in the claims.

Figure 1:
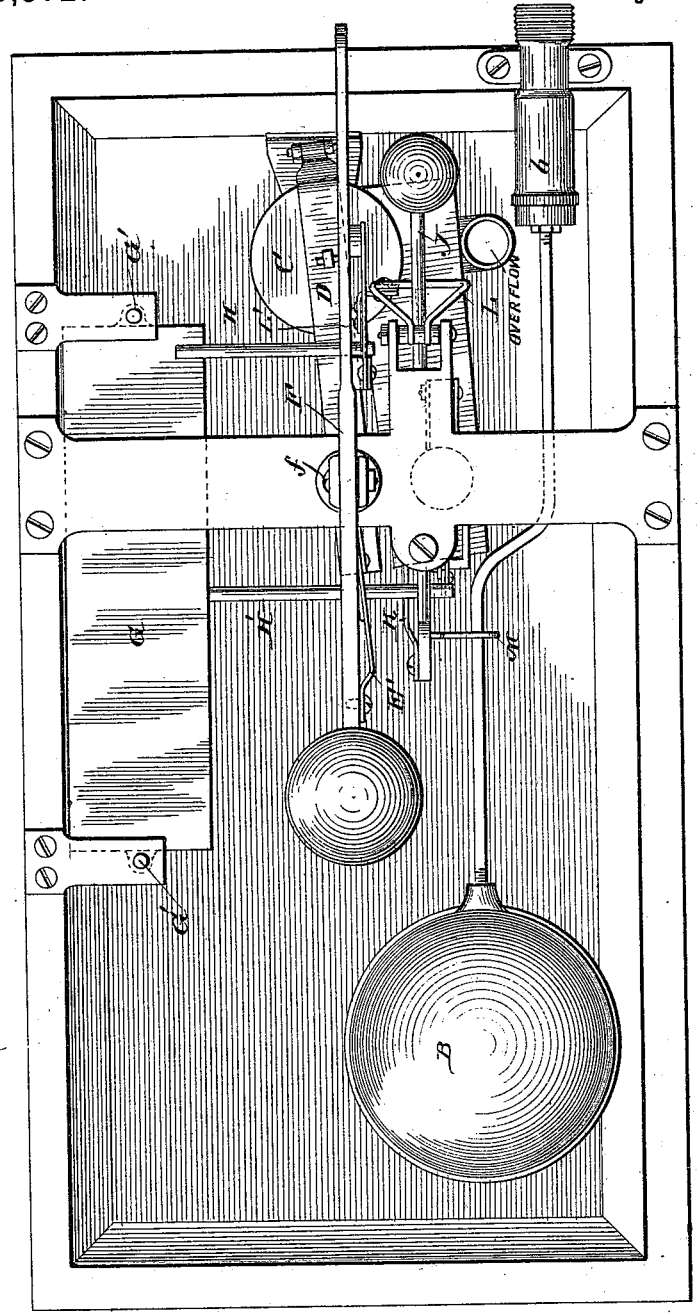
Figure 2:
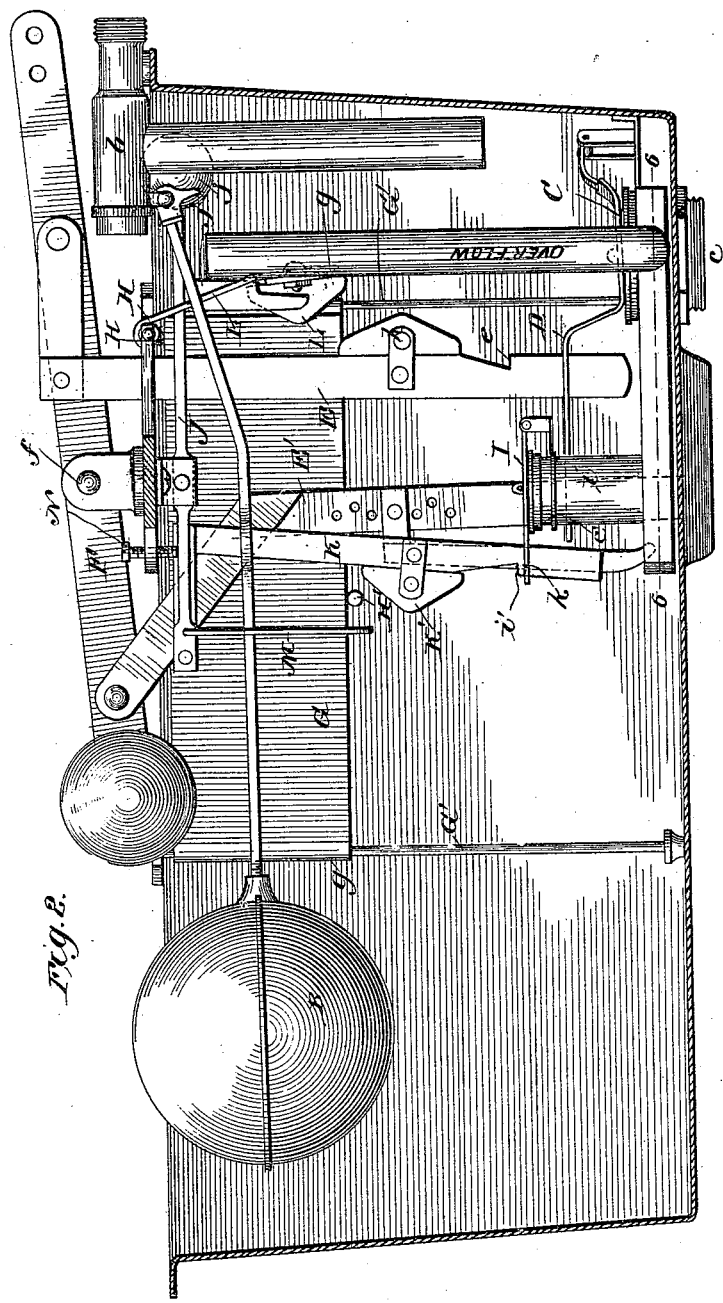
Figure 3:
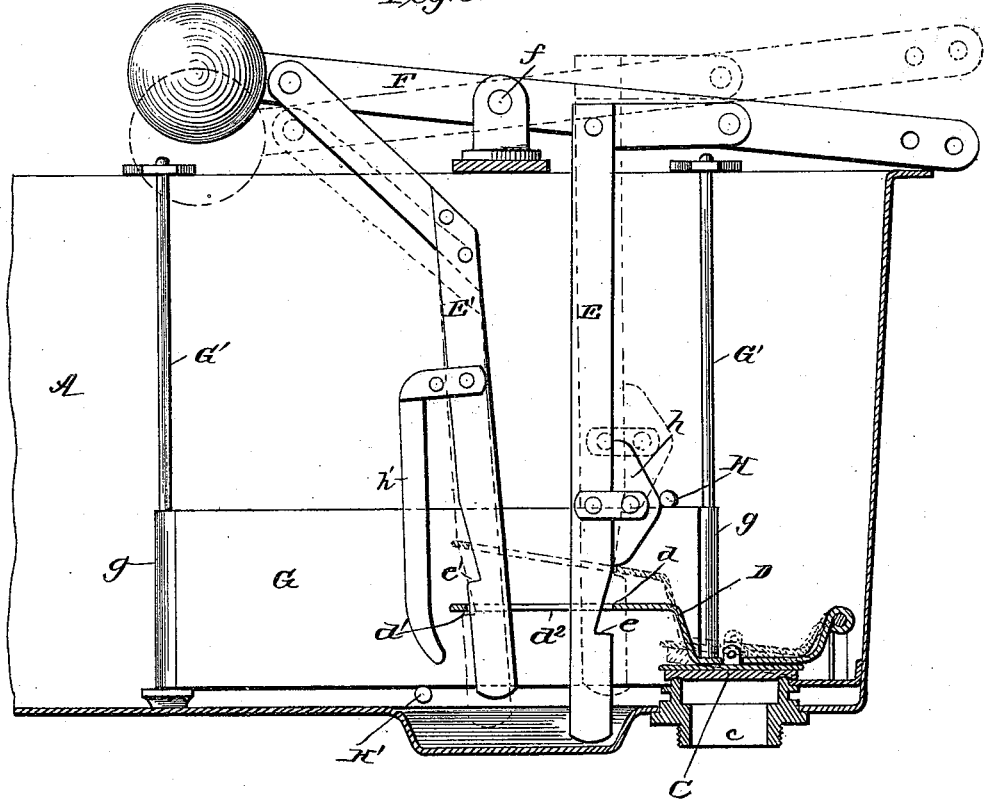
Figure 4:
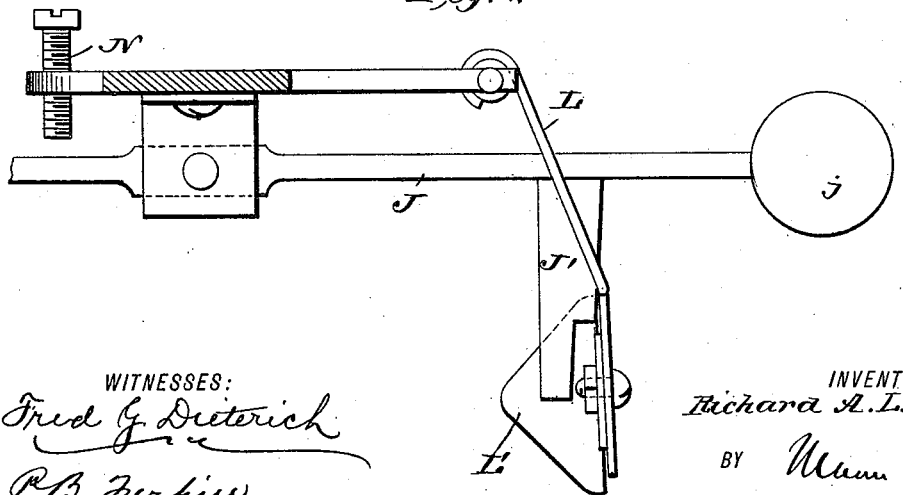
Figure 5:
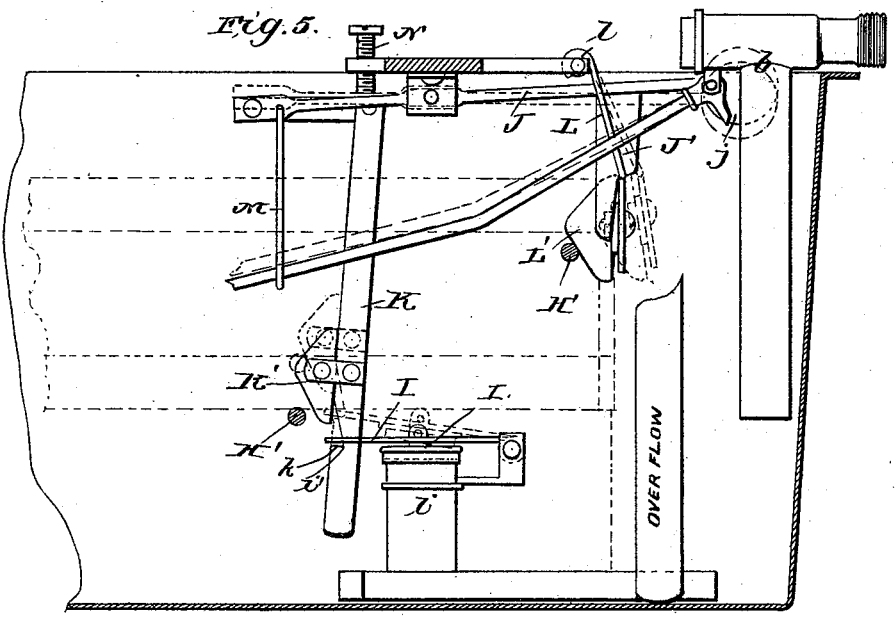
Figure 8:
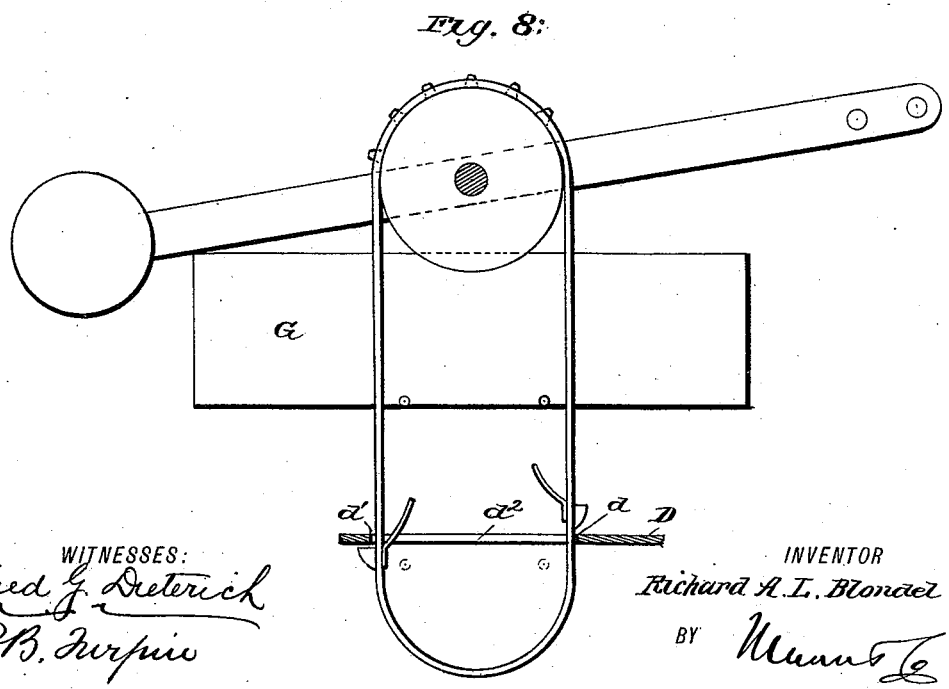
Figure 7:
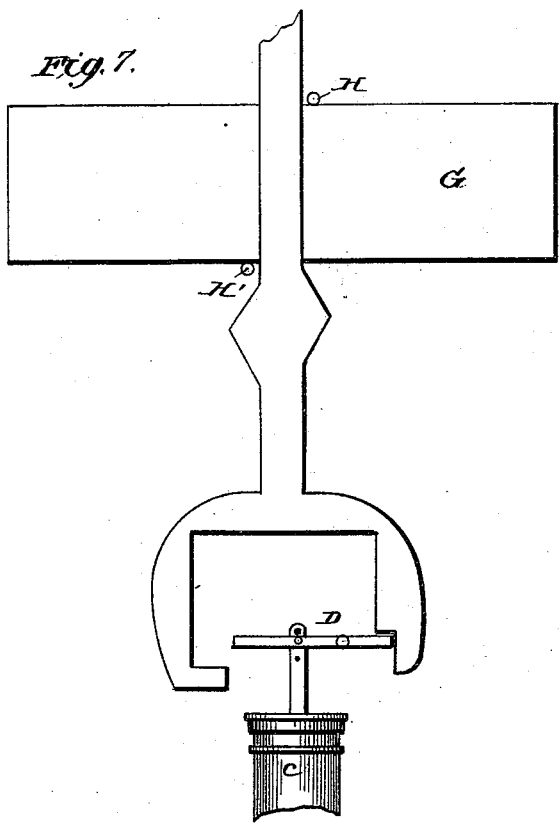
Figure 6:
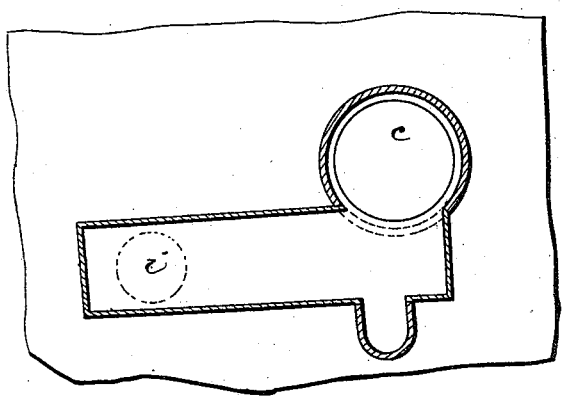

In the drawings, Figure 1 is a top plan view of a tank provided with my improvements. Fig. 2 is a side view of same with the front of the tank removed and the several parts being in the relation they would sustain if the tank were filled and ready for operation. Fig. 3 is a detail sectional view showing the devices for operating the flushing-valve. Fig. 4 is a detail view illustrating a part of the after-filling-valve lever, its latch, &c. Fig. 5 is a detached sectional view illustrating the devices for operating the after-filling valve. Fig. 6 is a detail section on about line 6 6 of Fig. 2, and Figs. 7 and 8 show somewhat different constructions within some of the broad principles of my invention.

The tank A may be of any suitable shape or size, has a suitable supply-inlet $b$, controlled by a valve operated by float B in the usual manner, and has a flushing-outlet $c$, controlled by valve C, such outlet being suitably connected with the closet with which the tank is to be used.

The valve C is by preference provided with a bar D, by lifting which the valve may be lifted or opened. I regard this bar D as part of the valve and shall so consider it in the following description and claims. In the construction shown in Fig. 2 the said bar D is pivoted at one end, connects between its ends with the valve proper, and is provided with bearings or portions $d\ d'$ on the free side of its pivot, which bearings are preferably the end walls of a slot $d^2$, as shown.

In carrying out my invention I provide the usual weighted lever F, which is pivoted at $f$, and may have its handle end operated by a pull-cord, or such end may be connected with the seat of the closet in any usual manner, so that such lever will be automatically operated by a person sitting on or getting off the said seat.

As a part of my invention I provide a connection between the lever F and the valve C, such connection being secured to one of such parts and arranged to detachably engage the other, so that as the lever is operated its motion may be transmitted to open the valve and permit the water to flow, which flow of water may be stopped by freeing the engagement of the connection at its detachable point. In carrying out this feature of my invention I prefer to make the connections in the form of bars E E′, referring to them specifically as swinging catch-bars, and to secure such bars to the lever F and construct and arrange them to detachably engage the valve. These bars E E′ are provided near their lower ends with upwardly-facing shoulders $e\ e'$, forming catches to engage the bearings $d\ d'$ of the valve, and I connect such bars E E′ at their upper ends with the lever F on opposite sides of its pivot $f$, the bar E′ being on the weight-arm and the bar E on the handle-arm of the lever, as shown. It will be seen that the said bars E E′ are pivotally secured to the lever, and that such pivots are so arranged that the bars will by gravity be moved against the bearings $d\ d'$, and will press against such bearings, except when positively pressed away therefrom. This operation of the bars E E′ is preferably effected by forming the same at their upper ends with portions which extend toward the free ends of the lever F, as shown, so that the tendency of the lower ends of the bars E E′ is to press by gravity against the bearings $d\ d'$. It will also be seen that as the lever rocks on its pivot one of the catch-bars E E′ will be raised as the other is lowered, so that the upward movement of one of the said bars to lift the valve-bar will operate to lower the other catch-bar to position for engaging the valve-bar at the next movement of the lever. On the bar E, I provide at $h$ a cam surface or projection, and a cam surface or projection $h'$ is provided on the bar E′.

A float G is supported in the tank to rise and fall as the tank fills and empties. By preference the float has eyes $g$, which slide on vertical guide-rods G', as will be understood from the drawings. This float G has a projecting rod H, arranged to engage the cam $h$ of bar E, and a projecting rod H', which engages the cam $h'$ of the bar E', such rods H H' forming trippers for tripping the bars E and E' out of engagement with the valve-bar D. The rod H is arranged at the top of the float G and the rod H' at the bottom of same, as shown.

In the operation of the described parts it will be seen that if the tank be full of water the parts described will assume the positions and relations shown in Fig. 2, and the float G will be at its uppermost position, the bar E will be arranged with its catch $e$ above the valve-bar D, and the bar E' will have its catch $e'$ arranged below the bar D and in position to engage the same when the handle end of the lever F is depressed. When the handle end is so depressed, the catch $e'$ engages the bar D and lifts the same, opening the valve C and permitting the water to flow. This is the before-wash, and it continues until the projecting rod H' strikes the cam or portion $h'$ of bar E', when the said rod H' will trip the bar E', causing its catch $h'$ to release the bar D. The valve will now close and the tank will fill, the lever being held with the weight elevated. When the lever is released, the tank being full, the tilting of the lever by its weight will lift bar E, the catch $e$ of which will engage the bar D and open the valve. This is the after-wash, and it will continue until the trip-rod H on the float G strikes the cam $h$ and releases the bar E from the bar D, when the valve C will again close and will not again open until the lever F is again operated to raise the weight, when the operation before described will be repeated.

It will be understood that the described movement of the lever will be effected by drawing on the pull-cord and holding the same until the first or before wash stops and then releasing the cord, or by sitting down on and getting off the seat, when the necessary connections are properly made therewith.

It will be understood from the foregoing that the float closes the valve C as it descends by the operation of its trip-rods H or H'. By connecting the cam-like portions $h\, h'$ adjustably with the bars E E', so that they can be set up or down on the same, the points at which the valve will be closed, and consequently the amount of water discharged at each wash, may be varied. Manifestly the equivalent of adjusting the cams would, to a certain extent, be attained by connecting the trip-rods H H' adjustably with the float G.

I desire it understood that while I prefer the construction of parts as shown in Fig. 2, I do not wish to be limited in the broad features of my invention thereto. For instance, if only a single wash is desired—that is to say, a before or an after wash—it may be secured by either one of the bars E E', the other being omitted. It will also be understood that but a single bar might be provided and arranged to effect both a before and an after wash. This may be better understood on reference to Fig. 7 of the drawings. In this figure the bar D of the valve is hinged between its ends, and a single catch-bar is provided with both upwardly and downwardly facing catch-shoulders, which engage the valve-bar and effect an opening of the valve in both the downward and upward movements of the catch-bar; but I much prefer the construction as shown in Fig. 2 and before fully described. The construction may be further modified, as shown in Fig. 8, in which a pulley is fixed to turn with the lever, and a belt is secured to such pulley and has catch projections to engage the valve-bar and internal cam projections for engagement by the tripping projections of the floats.

It will be understood that I regard the constructions shown in Figs. 7 and 8 as to certain extents the equivalent of the catch-bar construction shown in Fig. 2.

It is well known that the rush and rapidity of the flushing-flow of water in tank-closets is frequently, if not as a rule, so great that it entirely empties the trap of the closet, to avoid which I provide an after-filling valve I, having its port $i$ communicating with the flushing-pipe and provided with a bar I', having a bearing $i'$, and so connected with the valve that the upward movement of the said bar I' will open the valve. It will be seen that the outlet controlled by the valve I is much smaller than the flushing-outlet, so that the flow of water out of such opening will be gentle and easy when the said valve I is opened. To operate this valve I, I provide a lever J, pivoted between its ends, provided at one end with a weight $j$ and having its other end or arm provided with a depending catch-bar K, which has a catch $k$ arranged to detachably engage the bearing $i'$ of the valve-bar I. This catch-bar K also has a cam-like portion K', which is preferably adjustable along the bar, as shown, and is arranged in position for engagement by the trip projection H' of float G, which projection H' operates to trip the catch-bar K out of engagement with the valve-bar I' and permit the valve I to close. The weighted arm of lever J has a bearing portion J', which is arranged to be engaged by a latch L, which is preferably made bail-shaped, pivoted at its upper end $l$, so that it may swing at its lower end into and out of engagement with the bearing portion J', and provided with a cam-like portion L', arranged for engagement by the trip projection H of the float G. At its end opposite the weight $j$ the lever J is loosely connected with the float B, preferably by providing such end of the lever with a link M, elongated vertically, and passing the rod of float B through such link, so that the float B may rise within said link M; but as it falls to its lowermost position it will operate such lever against its weight $j$, and so elevate said weight to cause the lever J to lower its catch-bar K to engage the valve-bar I'. It will be seen that when the float B is at its lowermost position, so as to tilt the lever J against weight $j$, the float G will also be in its lowermost position, and the latch L will be engaged with lever J to sustain the weight $j$ thereof. The water now enters through the supply-pipe, which has been opened by the lowering of float B. As the water enters it lifts float B so that its weight is clear of lever J, and also lifts float G, whose trip-rod H engages cam L' and moves the latch L away from lever J, permitting the latter to tilt by its weight $j$, and so open the valve I, which now permits the siphon-filling flow to continue. As the inflow of water is greater from the supply than the outflow from valve I, the float G will continue to rise and the valve I will remain open until the trip-rod H' of float G engages cam K' and detaches catch-rod K from the after-filling valve I, when the latter will close. The amount of flow out of valve I may be regulated by adjusting the cam K' along bar K; but I also prefer to use an adjustable stop N for limiting the movement of lever J, such stop being shown as a screw threaded in a suitable bearing above the lever J and capable of being adjusted to limit the movement of such lever by its weight $j$.

It will be seen that the float G operates to close the valve C as it descends and the valve I as it ascends, so that after the flushing of the closet, which is stopped as the float G approaches its lowest position, the after-filling valve I will be opened and will be closed as the float G rises.

It will be seen that the construction is perfectly automatic in its operation, there being no danger of the tank overflowing or of a constant flushing-flow being continued, and the after-filling valve being operated automatically to keep the siphon of the closet properly filled at all times.

So far as I am informed it is new to provide in a water-closet tank a flushing-valve, an after-filling valve, and mechanism by which to automatically operate both such valves, and I do not desire to be limited in the broad features of my invention to the specific construction of such mechanism as shown.

Having thus described my invention, what I claim as new is—

1. The combination of the tank, the valve, a bar or connection detachably engaging said valve and movable longitudinally, whereby it may be operated to lift the same, a cam-like projection or portion connected with said bar or connection, and a float having a projection or portion by which to engage said cam, substantially as set forth.

2. The combination of the tank, a valve therein, a lever, a connection secured to one of such parts (the lever or valve) and arranged to detachably engage the other one of such parts, and provided with a cam projection or portion, such connection being movable longitudinally and adapted to be so operated by the rocking of the lever whereby to open the valve, and a float having a portion or projection arranged to engage the cam and trip the connection out of engagement with the part it detachably engages, substantially as set forth.

3. The combination of the tank, the valve, the lever pivoted between its ends, bars or rods connected at their upper ends with the lever on opposite sides of it pivots and arranged to detachably engage the valve, and mechanism whereby to detach said bars or rods from the valve, substantially as set forth.

4. The combination of the tank, the valve therein, the lever, a connecting-bar movable longitudinally whereby to lift the valve, said connecting-bar being secured to one of the said parts (valve or lever) and arranged to detachably engage the other one of such parts and to move by gravity into engagement with said part, and having a cam-like portion or projection, and a float having a projection or portion by which to free the connecting-bar from such engagement, substantially as set forth.

5. The combination of the tank, the valve, the lever pivoted between its ends, bars or rods connected at their upper ends with the lever on opposite sides of its pivot and arranged to detachably engage the valve, cam portions on said bars or rods, and a float having portions or projections arranged to engage one of such cams on the upward and the other cam on its downward movement, substantially as and for the purposes set forth.

6. In a water-closet tank, the combination of the tank, the valve, the lever pivoted between its ends, bars connected with said lever on opposite sides of its pivot and arranged to detachably engage the valve, the vertically-movable float, and pins or projections on said float to engage and trip said bars, such projections being arranged in different horizontal planes, substantially as set forth.

7. In a tank having a valve through which an after-flow of water may be discharged to the closet, valve-operating devices within the tank, whereby said valve may be automatically opened as the tank fills with water, and a float within such tank by which to engage such devices to permit the closure of the valve, all substantially as described, whereby a sufficient quantity of water may be discharged subsequent to the after-wash to properly fill the closet, substantially as set forth.

8. The combination of the after-filling valve, the pivoted lever J, weighted at one end and having its opposite end detachably connected with the said valve, means whereby to detach such connection, and the float B, having a loose connection with the end of lever J opposite the weight thereof, whereby the rising of such float will not positively move such lever, but in its descending movement it will by gravity tilt the lever against the weight of the latter, a latch by which to hold the lever J with its weight elevated, and mechanism by which to release said latch, substantially as set forth.

9. The combination, in a tank, with the outlet-valve provided with a bar having bearings $d$ and $d'$, of the lever and the catch-bars E and E', pivoted to such lever on opposite sides of its pivot and provided with catches to engage the bearings $d$ $d'$ and with cam-like projections, and the float having tripping projections arranged to engage such cams and detach the catches from the valve-bar, substantially as set forth.

10. The combination of the tank, the lever F, the valve having its bar D provided with a slot $d^2$, the end walls $d$ $d'$ of which form bearings for the catch-bars, the lever F, and the catch-bars secured thereto and having their lower ends fitted in the slot $d^2$, and provided with catches to engage the bearings $d$ $d'$, substantially as set forth.

11. The combination of the tank, an after-filling valve therein, the lever J weighted at one end $j$, a detachable connection between its other end and the valve, a latch by which to hold said lever with its weight end elevated, mechanism by which to tilt the lever against the action of its weight, and float mechanism whereby to release said latch, and having a part or portion by which to engage and detach the connection between the lever and valve, substantially as set forth.

12. The combination of the tank, the flushing-valve, the after-filling valve, mechanism by which said valves may be opened and held opened, and a float by which to trip such mechanism and permit the said valves to close, such float being arranged to close the flushing-valve on its descending and the after-filling valve on its ascending movement, substantially as set forth.

13. The combination of the tank having a flushing-valve and an after-filling valve, the lever F, the catch-bars E E', connected at one end with such lever on opposite sides of its pivot, arranged at their opposite ends to detachably engage the valve, and provided with cams, the after-filling valve, the lever J, the bar K, connected with lever J, detachably engaging the after-filling valve, and provided with a cam, and the float G, having a projection H, arranged to engage the cam of bar E, and a rod H', arranged to engage the cams of bars E' and K, all substantially as and for the purposes set forth.

14. The combination of the tank, the valve I, the lever J, provided with a catch-bar constructed for detachably engaging the valve I and having a cam K', the latch L, arranged to engage the lever I and having a cam L', and the float G, having tripping projections by which to engage said cams K' L', substantially as set forth.

15. The combination of the after-filling valve, the lever J, weighted at one end, the adjustable stop N, by which to limit the movement of said lever, a detachable connection between the end of such lever opposite its weight and the valve, the float B, loosely connected with such end of the lever, whereby to tilt the lever against its weight, a latch for securing the lever when so tilted, and float mechanism whereby to release said latch and by which to trip the detachable connection between the lever and valve, all substantially as set forth.

16. In an apparatus substantially as described, the combination, with a valve, of a bar or its equivalent, constructed for detachable engagement with said valve and having a cam-like portion connected adjustably with it, and a float having a rod or portion arranged to engage such cam-like portion, substantially as set forth.

17. In an apparatus substantially as described, the combination, with the flushing-valve and the after-filling valve, of mechanism by which to open said valves and hold the same open, and a float provided with projections or portions by which to detach said valve-opening mechanism, whereby a single float may control the closure of both the valves, substantially as set forth.

18. The combination of the tank, a valve therein, a lever, a connection secured to one of such parts (the lever or valve) and arranged to detachably engage the other one of such parts, and provided with a cam projection or portion, and a tripping part or portion in the tank and arranged to engage the cam and trip the connection out of engagement with the part it detachably engages, the said connection being movable longitudinally to open the valve and arranged to be so moved by the rocking of the lever, substantially as set forth.

RICHARD A. L. BLONDEL.

Witnesses:
 JNO. T. MADDOX,
 LOUIS DUNGAN.